US005995076A

United States Patent [19]

Tsuboyama et al.

[11] Patent Number: 5,995,076

[45] Date of Patent: Nov. 30, 1999

[54] LIQUID CRYSTAL APPARATUS USING DIFFERENT TYPES OF DRIVE WAVEFORMS ALTERNATELY

[75] Inventors: Akira Tsuboyama, Sagamihara; Jun Iba, Atsugi, both of Japan

[73] Assignee: Canon Kabushiki Kaisha, Tokyo, Japan

[21] Appl. No.: 08/782,812

[22] Filed: Jan. 13, 1997

[30] Foreign Application Priority Data

Jan. 16, 1996 [JP] Japan .................................... 8-005179

[51] Int. Cl.[6] .............................. G02F 1/133; G09G 3/36

[52] U.S. Cl. .............................................. 345/97; 345/208

[58] Field of Search .......................... 359/56, 67; 345/97, 345/208

[56] References Cited

U.S. PATENT DOCUMENTS

| | | | |
|---|---|---|---|
| 4,674,839 | 6/1987 | Tsuboyama et al. | 350/334 |
| 4,836,656 | 6/1989 | Mouri et al. | 350/350 |
| 4,902,107 | 2/1990 | Tsuboyama et al. | 350/350 |
| 5,026,144 | 6/1991 | Taniguchi et al. | 350/350 |
| 5,033,822 | 7/1991 | Ooki et al. | 350/331 T |
| 5,041,821 | 8/1991 | Onitsuka et al. | 340/784 |
| 5,058,994 | 10/1991 | Mihara et al. | 359/56 |
| 5,267,065 | 11/1993 | Taniguchi et al. | 359/56 |
| 5,321,419 | 6/1994 | Katakura et al. | 345/97 |
| 5,461,494 | 10/1995 | Sekimura et al. | 359/67 |
| 5,506,601 | 4/1996 | Mihara et al. | 345/103 |
| 5,583,534 | 12/1996 | Katakura et al. | 345/97 |
| 5,592,191 | 1/1997 | Tsuboyama et al. | 345/97 |
| 5,602,562 | 2/1997 | Onitsuka et al. | 345/101 |
| 5,606,343 | 2/1997 | Tsuboyama et al. | 345/97 |

FOREIGN PATENT DOCUMENTS

| | | |
|---|---|---|
| 0281160 | 9/1988 | European Pat. Off. . |
| 0569029 | 11/1993 | European Pat. Off. . |
| 0621579 | 10/1994 | European Pat. Off. . |
| 63155032 | 6/1988 | Japan . |
| 64-31129 | 1/1989 | Japan . |
| 6451818 | 2/1989 | Japan . |
| 3-155524 | 3/1991 | Japan . |
| 6-230751 | 8/1994 | Japan . |

*Primary Examiner*—Matthew Luu
*Assistant Examiner*—Jeff Pizial
*Attorney, Agent, or Firm*—Fitzpatrick, Cella, Harper & Scinto

[57] ABSTRACT

A liquid crystal apparatus is constituted by a liquid crystal device including a pair of substrates having thereon a group of scanning electrodes and a group of data electrodes intersecting the scanning electrodes so as to form an electrode matrix, and a liquid crystal disposed between the substrates so as to form a pixel at each intersection of the scanning electrodes and the data electrode assuming an ON-state and an OFF-state; scanning signal application means for sequentially applying a scanning signal to the scanning electrodes; data signal-application means for applying data signals including a first data signal and a second data signal selectively to the data electrodes in synchronism with the scanning signal, and control means for periodically switching between a first drive mode of using the first and second data signals for providing the ON- and OFF-states, respectively, of the pixels and a second drive mode of using the first and second data signals for providing the OFF- and ON-states, respectively, of the pixels. The liquid crystal apparatus is effective for suppressing a change in drive waveform frequency depending on a display pattern to suppress the occurrence of crosstalk thereby.

6 Claims, 11 Drawing Sheets

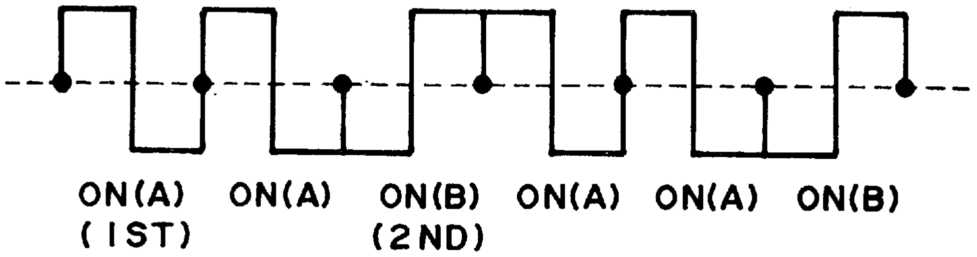
FIG. 4A
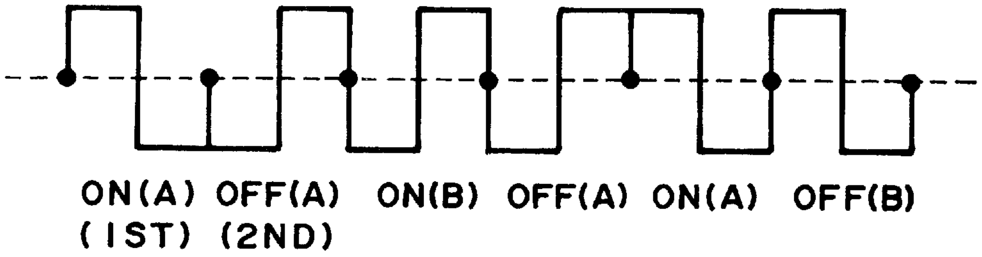
FIG. 4B
| FRAME | 1ST WAVEFORM A | 2ND WAVEFORM B |
|---|---|---|
| 3n+0 | 3n+1-TH LINE, 3n+2-TH LINE | 3n+0-TH LINE |
| 3n+1 | 3n+2-TH LINE, 3n+0-TH LINE | 3n+1-TH LINE |
| 3n+2 | 3n+0-TH LINE, 3n+1-TH LINE | 3n+2-TH LINE |
FIG. 5

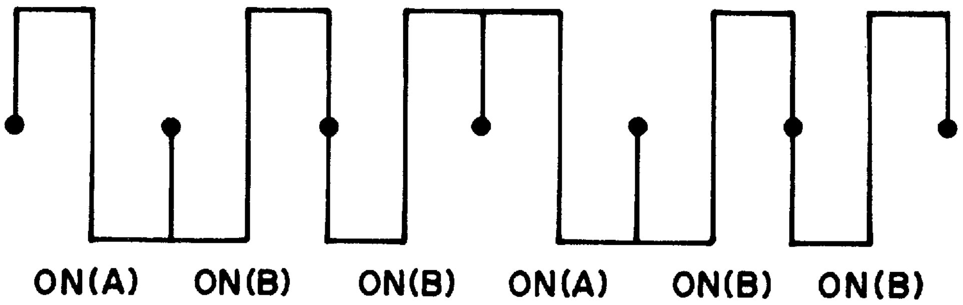
FIG. 7A
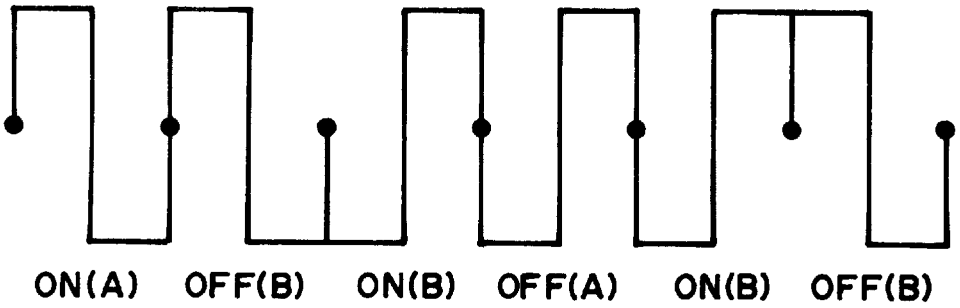
FIG. 7B
| SCAN SEQUENCE | DRIVE WAVEFORM | |
|---|---|---|
| NUMBER OF SKIPPED LINES | A | B |
| 1 LINE | 3n+0, 3n+1 | 3n+2 |
| 2 LINES | 3n+0, 3n+1 | 3n+2 |
| 4 LINES | 3n+0, 3n+1 | 3n+2 |
| 5 LINES | 3n+0, 3n+1 | 3n+2 |
FIG. 9

LIQUID CRYSTAL APPARATUS USING DIFFERENT TYPES OF DRIVE WAVEFORMS ALTERNATELY

FIELD OF THE INVENTION AND RELATED ART

The present invention relates to a liquid crystal (drive) apparatus including a liquid crystal device, particularly a liquid crystal apparatus for multiplexing drive of a liquid crystal device.

There has been a well-known type of liquid crystal device wherein a plurality of scanning (signal) electrodes and a plurality of data (signal) electrodes are disposed to intersect each other and a liquid crystal is disposed between a pair of substrates carrying the scanning electrodes and the data electrodes so as to form a pixel at each intersection of the scanning electrodes and the data electrodes. Such a liquid crystal device may for example be designed to be driven by applying a set of drive signals shown in FIG. 11A (or FIG. 11B) which include scanning signals including a scanning selection signal and a scanning non-selection signal, and data signals including ON-data signal and OFF-data signal. In all the figures including FIGS. 11A and 11B, "1LS" represents one (scanning) line-selection period.

In these drive signals, each scanning selection signal (of those shown in FIGS. 11A and 11B) comprises a clear(ing) phase and a write (or writing) phase so as to clear pixels on one line in advance in the clear phase and then write in the pixels on the one line in the write phase.

On the other hand, data signals (applied to data electrodes) in the set of FIG. 11A comprise simple bipolar data pulses, whereas data signals in the set of FIG. 11B comprise an ON-data signal or on OFF-data signal and compensation pulses of a polarity opposite to that of the ON- or OFF-data signal for DC compensation before and after the data signal. The compensation pulses each have a width which is half that of the data signal, and the waveform shown in FIG. 11B is caused to have a higher frequency than the waveform shown,in FIG. 11A.

Now, some explanation will be made regarding the difference in effect between the waveforms shown in FIGS. 11A and 11B when used for displaying a picture 20 as shown in FIG. 12, which includes a pattern display region 20*a* of alternate black and white stripes appearing every other line on a white background region 20*b*. In the case of displaying such a picture, there results in a difference in brightness of "white" between the region (3)-(*a*) (on row (3) and column (*a*)) and the region (3)-(*b*) (on row (3) and column (*b*))) equally displaying "white". This may be attributable to a difference in display signals between those applied at the column (*a*) region for providing the pattern display region 20*a* including alternate black and white stripes and those applied at the column (*b*) region only for providing the white background region 20*b*.

More specifically, if the row (2) region in FIG. 12 is scanned by the drive waveform shown in FIG. 11A, the column (*b*) region is supplied with continuation of ON-data signals (for displaying "while"), so that the data electrodes for the column (*b*) region are supplied with a continuation of data signals as shown in FIG. 13A. On the other hand, in the period of scanning the row (2) region, the data electrodes for the column (*a*) region are supplied with ON- and OFF-data signals alternately for displaying alternate black and white stripes as shown in FIG. 13B.

Incidentally, when a frequency difference occurs in applied voltage waveform depending on a display pattern, there also occurs a difference in optical response of the liquid crystal to cause a change in contrast on the picture display area, thereby causing a so-called "crosstalk". In case of the waveform shown in FIG. 11A, the frequency of the waveform applied to the background region 20*b* (FIG. 12) as shown in FIG. 13A is twice the frequency of the waveform applied to the pattern display region 20*a* (FIG. 12) as shown in FIG. 13B. Based on the frequency difference, during the scanning of the row (2) region, there arises a contrast difference between the background region (3)-(*a*) and the background region (3)-(*b*).

Also, in case of the waveform shown in FIG. 11B, the frequency of the waveform applied to the pattern display region 20*a* shown in FIG. 14B is higher than the frequency of the waveform applied to the background region 20*b* shown in FIG. 14A, so that a crosstalk (contrast difference) occurs between the region (3)-(*a*) and the region (3)-(*b*).

The occurrence of the crosstalk may be suppressed by lowering the waveform frequency, but such a-lowering in drive waveform frequency results in flicker on the display picture when applied to a conventional driving method for liquid crystal device, so that it is not applicable to a high-quality picture display.

On the other hand, as another demand on current liquid crystal device display technology, a lower electric power consumption is desired in addition to a high picture or image quality. The power consumption for drive of a liquid crystal device depends on the frequency of application voltage waveform and basically increases in proportion to an increase in frequency. This is because a charge-discharge current to the liquid crystal device occurs at each switching of applied voltage polarity. As a higher frequency leads to a higher power consumption, the data signals shown in FIG. 11A (giving the waveforms shown in FIGS. 13A and 13B) require a relatively lower power consumption than the data signals shown in FIG. 11B (giving the waveforms shown in FIGS. 14A and 14B).

In order to minimize the power consumption for an entire liquid crystal apparatus, it is required to minimize the power consumption by the liquid crystal apparatus (panel) drive system. However, the accomplishment thereof by using a lower frequency obstructs a higher picture quality display.

SUMMARY OF THE INVENTION

Accordingly, a principal object of the present invention is to provide a liquid crystal apparatus capable of suppressing crosstalk and realizing a high picture quality at a low power consumption.

According to the present invention, there is provided a liquid crystal apparatus, comprising:

- a liquid crystal device comprising a pair of substrates having thereon a group of scanning electrodes and a group of data electrodes intersecting the scanning electrodes so as to form an electrode matrix, and a liquid crystal disposed between the substrates so as to form a pixel at each intersection of the scanning electrodes and the data electrode assuming an ON-state and an OFF-state,
- scanning signal application means for sequentially applying a scanning signal to the scanning electrodes,
- data signal-application means for applying data signals including a first data signal and a second data signal selectively to the data electrodes in synchronism with the scanning signal, and
- control means for periodically switching between a first drive mode of using the first and second data signals for providing the ON- and OFF-states, respectively, of the pixels and a second drive mode of using the first and second data signals for providing the OFF- and ON-states, respectively, of the pixels.

Based on the above-mentioned apparatus arrangement, a scanning signal is sequentially applied to the scanning electrodes and, in synchronism therewith, data signals including a first data signal and a second data signal are selectively applied to the data electrodes to display a picture on the matrix pixels. Further, the first data signals and the second data signals are used for displaying the ON- and OFF-states, respectively, of the pixels in the first drive mode and for displaying the OFF- and ON-states, respectively, of the pixels in the second drive mode. The first and second drive modes are switched between each other periodically or for each prescribed scanning period. As a result, the frequencies of drive voltage waveform for both a display picture region and a background region of a display panel (or display unit) may be lowered, and also the frequency difference therebetween may be decreased.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 4A and 4*b* each show a succession of data signals applied to a data electrode, while exchanging scanning signal waveforms.

FIG. 5 shows a table indicating allotment of two types of scanning signal waveforms to respective lines in respective frames.

FIGS. 7A and 7B each show a succession of data signals applied to a data electrode in the drive scheme shown in FIG. 6.

FIG. 9 shows a table indicating allotment of two types of scanning signal waveforms to respective scanning lines for several interlaced scanning schemes having different numbers of skipped scanning lines.

DESCRIPTION OF THE PREFERRED EMBODIMENTS

Figure 1:
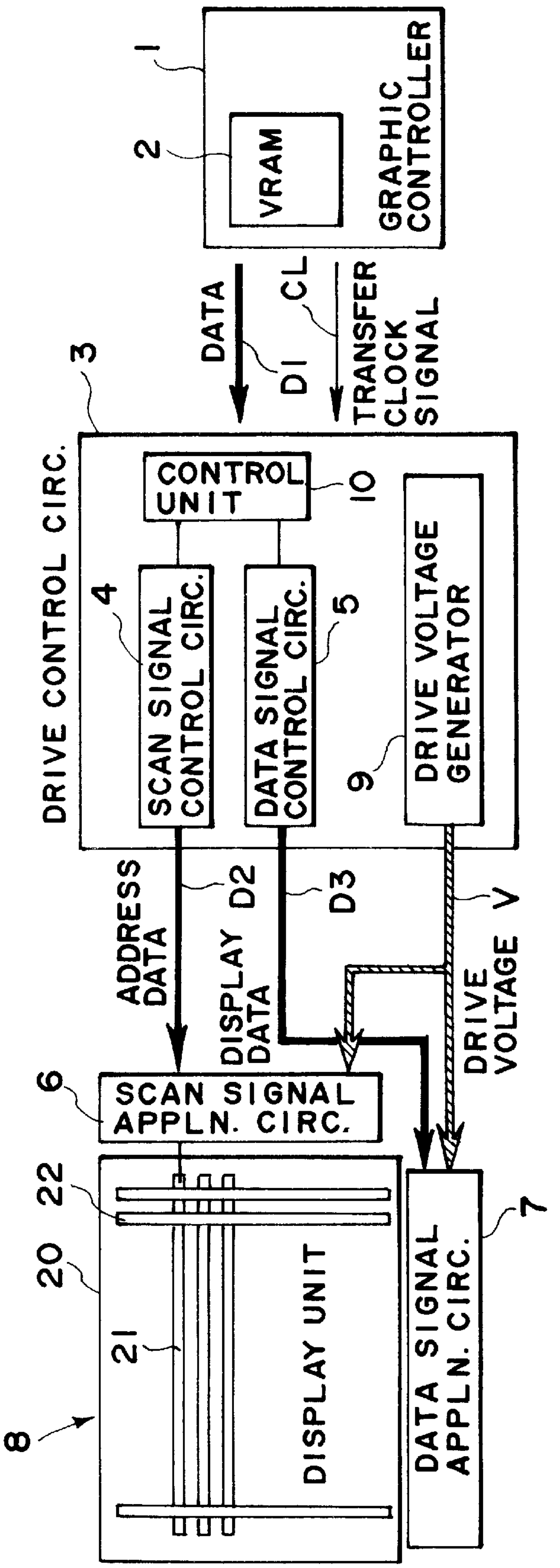
FIG. 1 is a block diagram for illustrating an organization of an embodiment of the liquid crystal apparatus according to the invention including a liquid crystal device.

FIG. 1 is a black diagram of a liquid crystal apparatus (display apparatus) according to an embodiment of the present invention. Referring to FIG. 1, the liquid crystal apparatus includes a graphic controller 1 including a video RAM (VRAM) 2. From the graphic controller 1, picture display data D1 is transferred to a drive control circuit 3 according to a transfer clock signal CL.

The picture display data D1 from the graphic controller 1 is inputted to a scanning signal control circuit 4 and a data signal control circuit 5 in the drive control circuit 3 and converted into scanning signal address data D2 and display data D3, respectively.

Based on the scanning signal address data D2 and the display data D3, a scanning signal application circuit 6 and a data signal application circuit 7 apply scanning signals and data signals carrying respective voltages generated by a drive voltage generation circuit 9 to scanning electrodes 21 and data electrodes 22, respectively, of a display unit (display panel) 20 of a liquid crystal device 8, whereby a picture corresponding to supplied picture data is displayed on the display unit 20.

In this embodiment, the liquid crystal device 8 may suitably comprise a device using a chiral smectic liquid crystal showing ferroelectricity or anti-ferroelectricity or a chiral nematic liquid crystal showing two metastable state.

A chiral smectic liquid crystal suitably used in a surface-stabilized ferroelectric liquid crystal panel exhibiting optical bistability may for example exhibit following properties as principal properties:

Spontaneous polarization: 7 nC/cm$^2$ (at 30° C.)

Tilt angle: 15 deg.

Phase transition temperature:

$$\text{Crystal} \xrightarrow{-10^\circ\text{ C.}} \text{SmC*} \xrightarrow{65^\circ\text{ C.}} \text{SmA} \xrightarrow{80^\circ\text{ C.}} \text{Ch.} \xrightarrow{95^\circ\text{ C.}} \text{Iso.}$$

A commercially available example of anti-ferroelectric liquid crystal may include “CS4000” (available from Chisso K.K.).

Figure 2A:
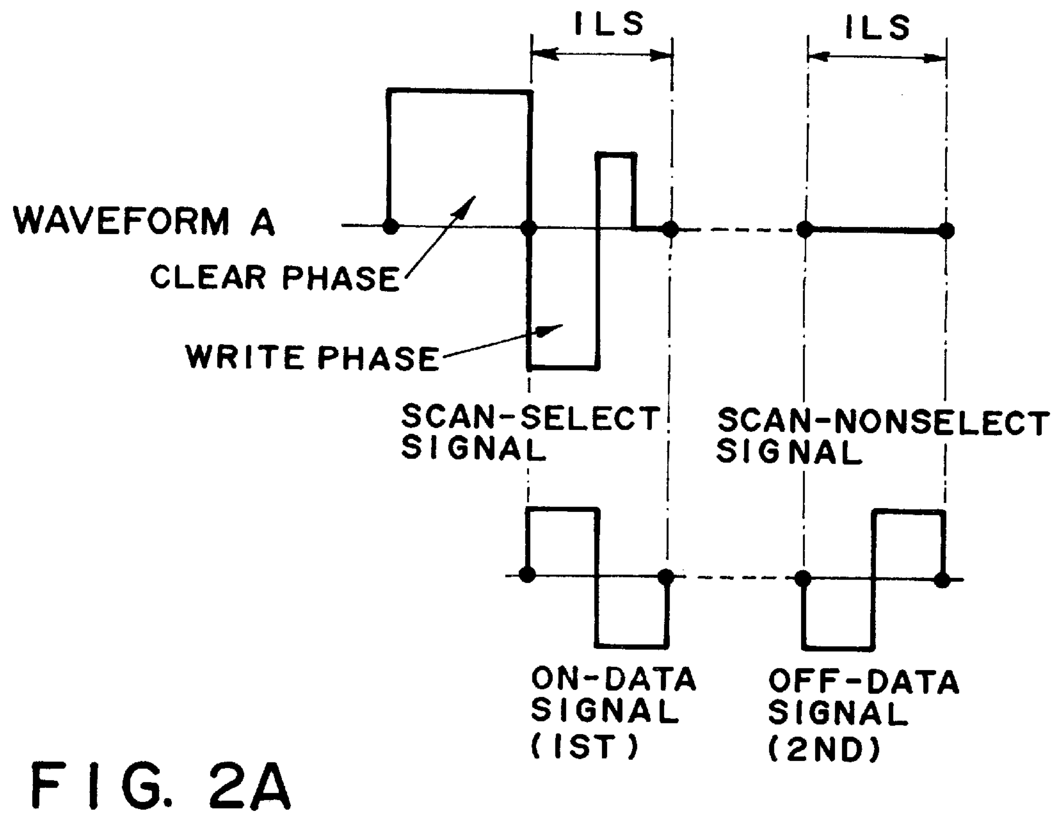
FIGS. 2A and 2B illustrate two types of drive waveforms each including a set of scanning signals and data signals for driving a liquid crystal device.
Figure 2B:
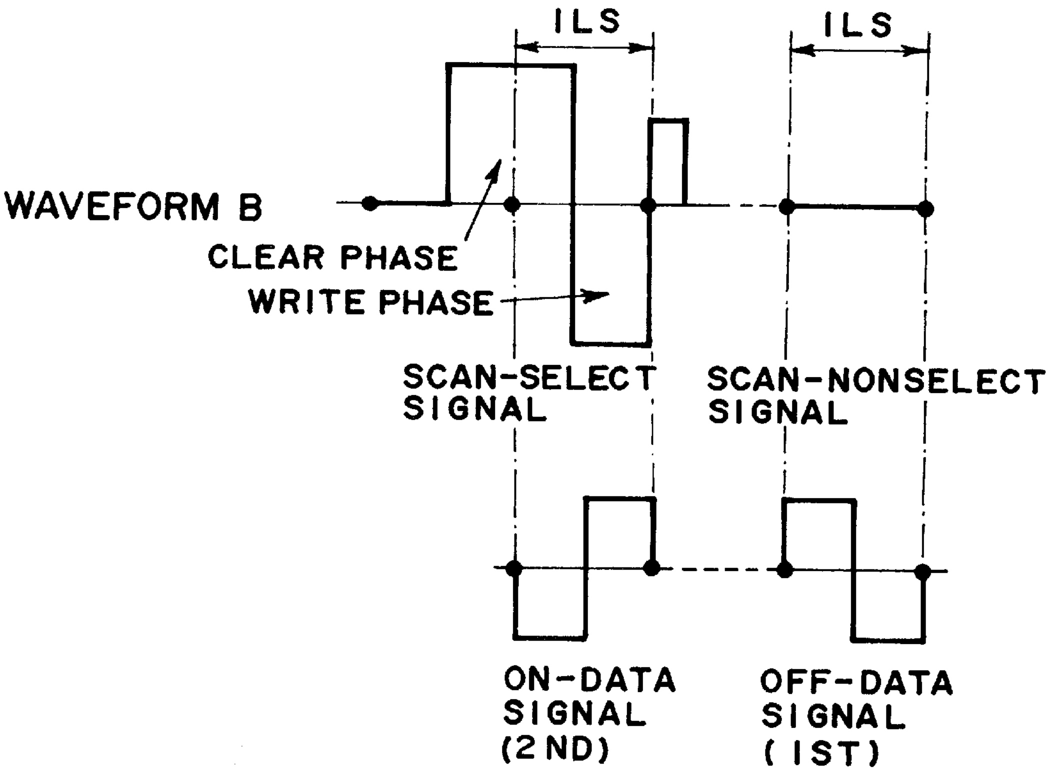

In this embodiment, the scanning signal application circuit 6 and the data signal application circuit 7 supply scanning signals and data signals to the scanning electrodes 21 and the data electrodes 22 according to a first drive mode using a drive waveform A shown in FIG. 2A and a second drive mode using a drive waveform B shown in FIG. 2B. In the first drive waveform A shown in FIG. 2A, a first data signal is used as an ON-data signal (i.e., a data signal for providing an ON (bright)-state of a pixel) and a second data signal is used as an OFF-data signal (i.e., a data signal for providing an OFF (dark)-state of the pixel). The first and second data signals are in a relationship of mutually anti-phases. On the other hand, in the second drive waveform B shown in FIG. 2B, the first data signal is used as an OFF-data signal and the second data signal is used as an ON-data signal. Thus, in the drive waveforms A and B, an identical optical state is formed by application of the two data signals (first data signal and second data signal) of mutually anti-phases. Further, corresponding to the difference in data signals, the writing phase of a scanning selection signal is taken at a former half of one-line selection period (1LS) in the drive waveform A, and is taken at a latter half of one-line selection period (1LS) in the drive waveform B.

The drive control circuit 3 includes a scanning signal control circuit 4, a data signal control circuit 5 and a control unit 10 for controlling the circuits 4 and 5 so as to switch between the two drive waveforms A and B, i.e., to switch between the corresponding two scanning selection signals at each prescribed number of horizontal scanning periods (writing lines) and switch the polarities of the data signals (i.e., switch between the first and second data signals) in synchronism with the switching between the two scanning selection signals.

Figure 3:
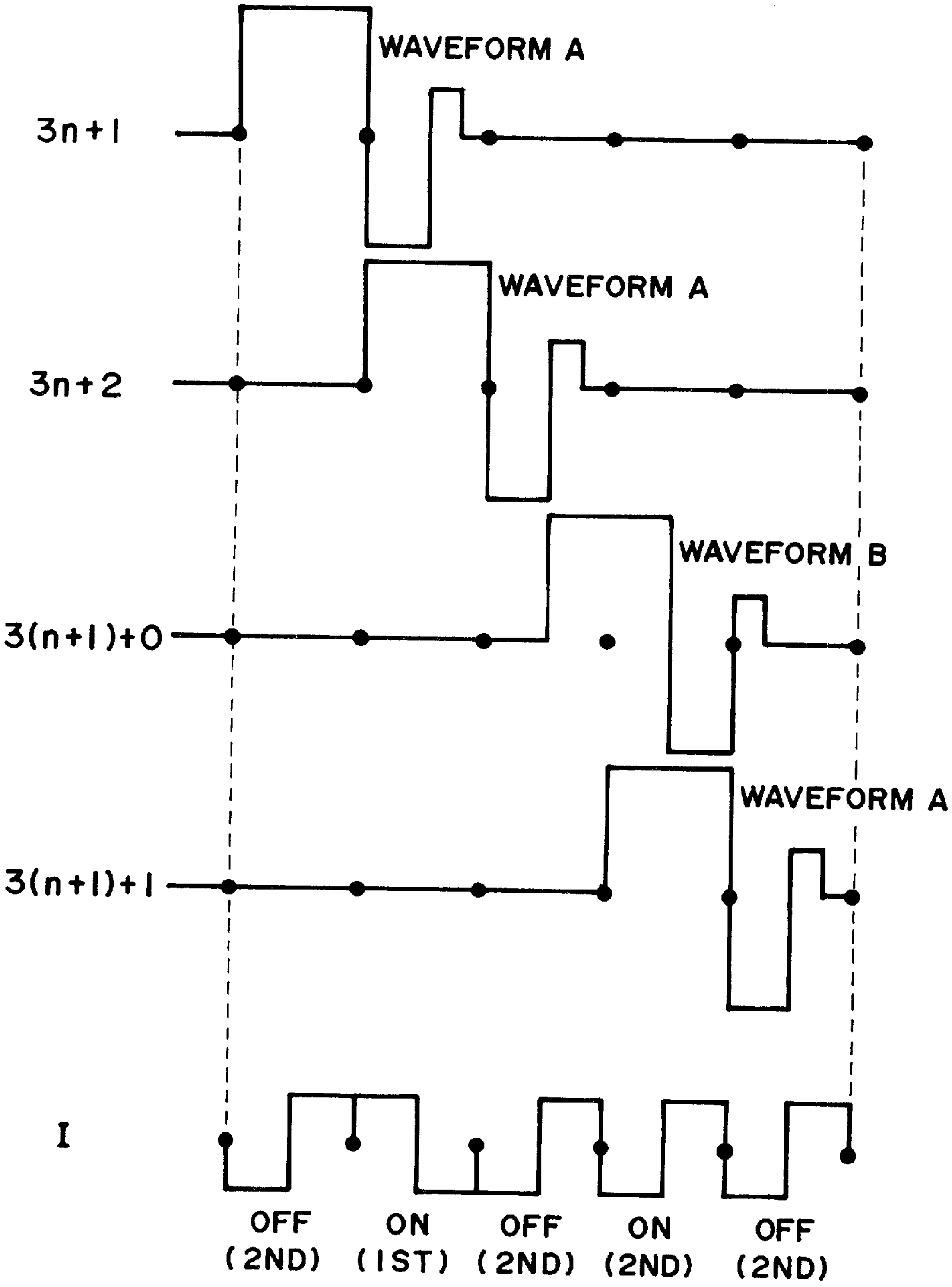
FIG. 3 illustrates a partial set of time serial waveforms showing two types of drive waveforms applied alternately including two types of scanning signals applied to the scanning electrodes 3*n*+1, . . . and two types of data signals applied in series to a data electrode I.

In this embodiment, the control unit 10 effects a mode selection in one frame as shown in FIG. 3 such that the scanning signal of the first drive waveform A is applied to 3*n*+1-th and 3*n*+2-th scanning lines and the scanning signal of the second drive waveform B is applied to 3*n*-th scanning lines (wherein n is an integer of 1, 2, 3, . . . ). Thus, two-types of scanning signals are used in mixture or alternately in a certain sequence, so that the scanning selection signal of the drive waveform B is applied to every third scanning line.

Figure 12:
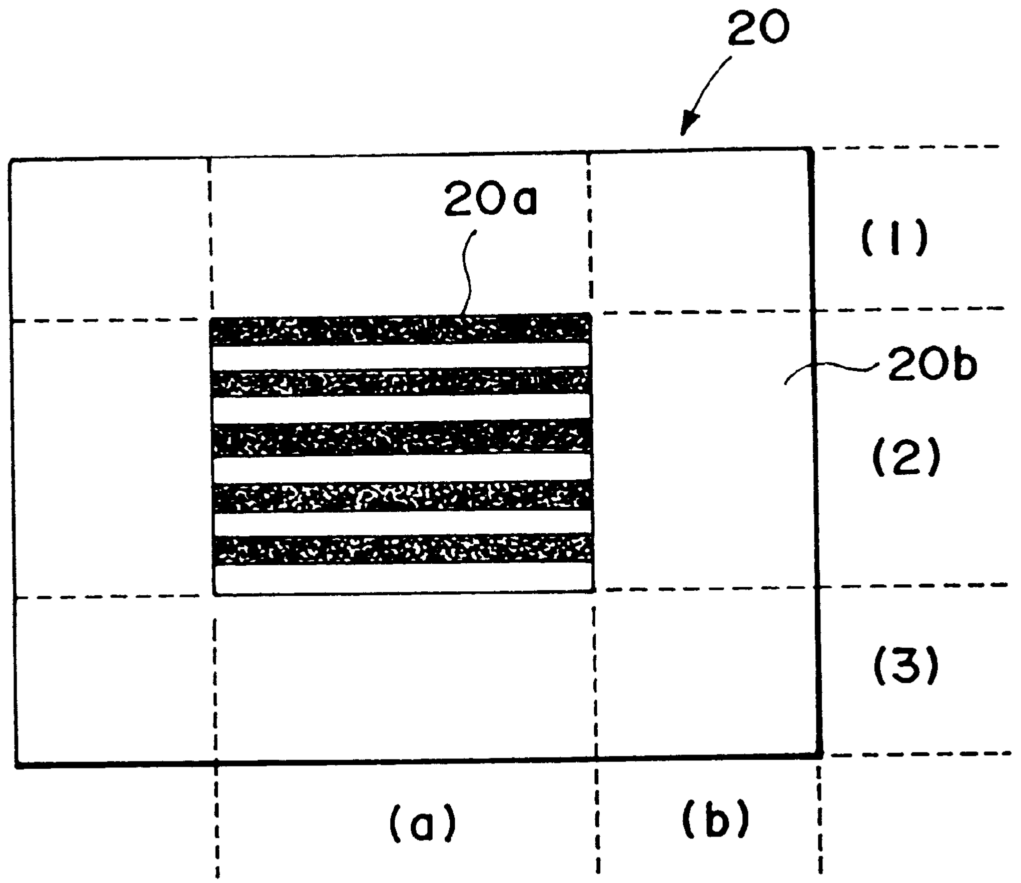
FIG. 12 PRIOR ART
FIG. 12 illustrates a picture pattern including a pattern display region and a background region.

Accompanying the switching between the scanning selection signals, the corresponding different data signals are used, i.e., switching between the first and second drive modes is effected. When the row (2) region in the picture area shown in FIG. 12 is scanned with such two type of scanning signals, a data electrode corresponding to the pattern display region 20*a* is supplied with a succession of data signals as shown in FIG. 4B, and a data electrode corresponding to the background region 20*b* is supplied with a succession of data signals as shown in FIG. 4A. Thus, the successions of data signal shown in FIGS. 4A and 4B (which are applied as they are to pixels at the time of non-selection) both include a low-frequency portion and a high-frequency portion, thus not providing a substantial difference depending on a difference in display pattern.

In this way, by using two types of scanning signals in mixture in a certain sequence and switching the polarities of data signals for providing an identical optical state in synchronism with the switching of the scanning signals, it becomes possible to reduce the difference in frequency of drive waveforms applied to the pattern display region 20*a* and the background region 20*b*, thus suppressing a picture quality deterioration, such as crosstalk. Thus, even when a display pattern 20*a* including one-line alternate horizontal stripes of black and white is displayed on a white back ground 20*b*, a good picture free from crosstalk can be obtained.

Figure 13A:
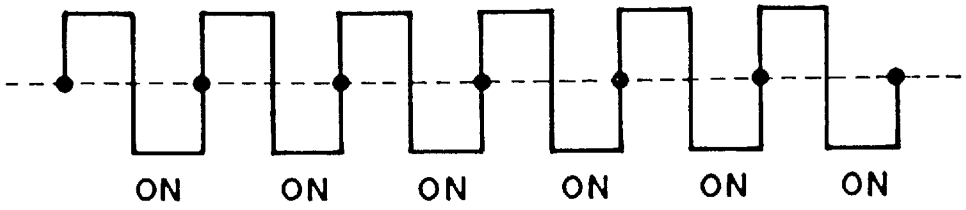
FIG. 13A PRIOR ART
FIGS. 13A and 13B show successions of data signals applied to regions 20*b* and 20*a*, respectively, in FIG. 12 by using a set of drive waveform shown in FIG. 11A.
Figure 13B:
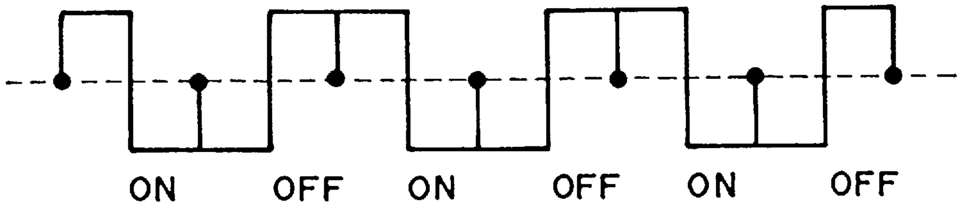
FIG. 13B PRIOR ART
Figure 14A:
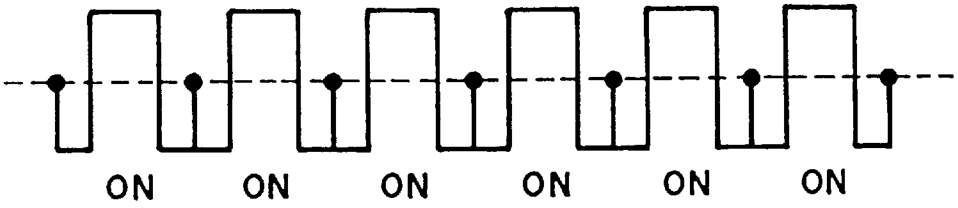
FIG. 14A PRIOR ART
FIGS. 14A and 14B show successions of data signals applied to regions 20*b* and 20*a*, respectively, in FIG. 12 by using a set of drive waveform shown in FIG. 11B.
Figure 14B:
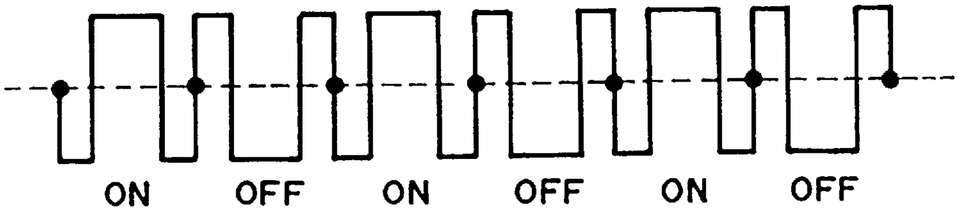
FIG. 14B PRIOR ART

Incidentally, in this first embodiment, the drive waveform switching (i.e., drive mode switching) is performed in a three line cycle. This has been adopted in consideration of the fact that a liquid crystal display device used as a computer monitor is frequently used to display or draw a periodical pattern in a cycle of $2^n$ based on data processed according to a binary code system. If such a periodically changing display pattern is synchronized with the cycle of switching of the drive waveforms, the succession of data signals directly applied to pixels at the time of non-selection can be separated into a high-frequency waveform succession or a low-frequency waveform succession, so that a crosstalk explained with reference to FIGS. 13A and 13B (or FIGS. 14A and 14B) can occur in some cases. Thus, in order to minimize the probability of synchronization with the drawing or picture pattern cycle, it is advantageous to effect a switching of driving modes in a cycle including an odd number of scanning lines.

Figure 11A:
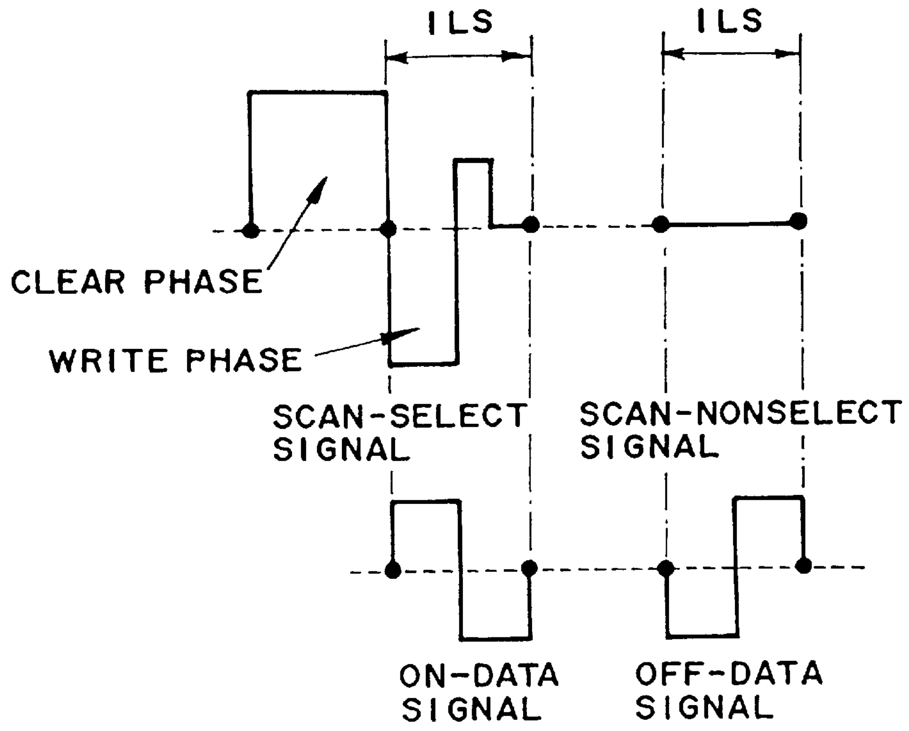
FIG. 11A PRIOR ART
FIGS. 11A and 11B each show a conventional type of drive waveform (set of unit scanning signals and data signals).
Figure 11B:
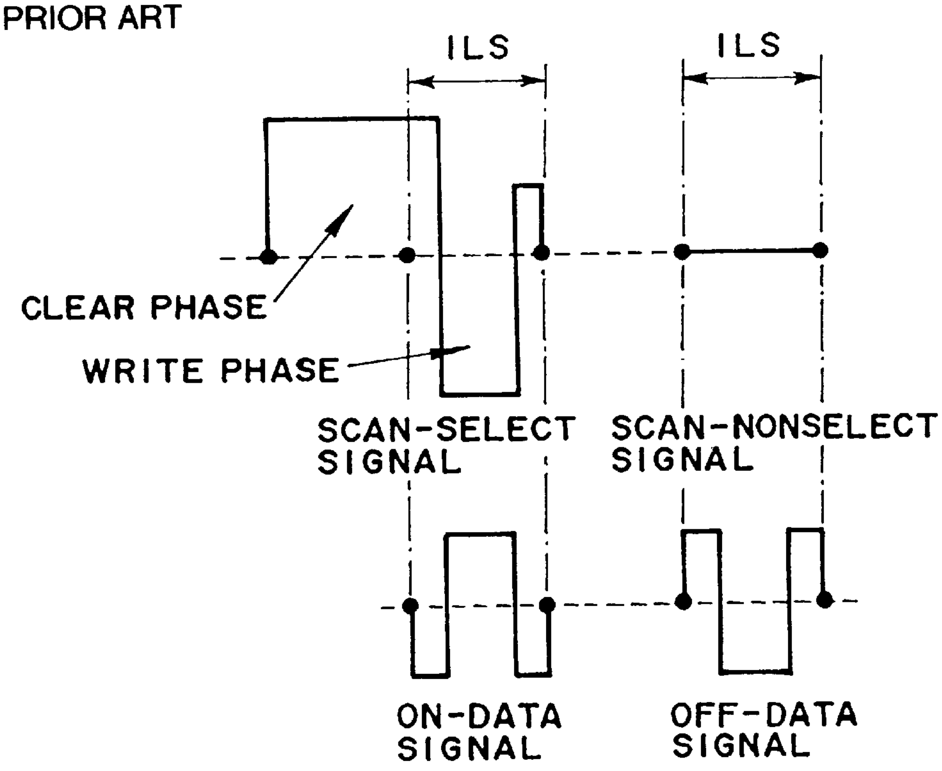
FIG. 11B PRIOR ART

Regarding the power consumption, while it depends also on a display pattern, the data signals used in this embodiment has a frequency which is comparable to that used in the drive waveform A shown in FIG. 11A and nearly a half of that used in the drive waveform B shown in FIG. 11B. As a result, the power consumption in this embodiment is roughly equal to that of the drive waveform A in FIG. 11A and almost half that of the drive waveform B in FIG. 11B on an average.

Thus, by periodically switching between two drive modes including different scanning signals and different data signals of mutually opposite polarities for displaying an identical display state, it becomes possible to obviate a remarkable frequency difference of drive waveform in displaying remarkably different display patterns at a low power consumption.

Further, when actual test designed for a user using a liquid crystal panel for a word processor was performed according to this embodiment using the drive waveforms A and B in a three-line cycle, the reduction in power consumption of the liquid crystal panel was confirmed, and an improved picture quality was attained.

In case where a liquid crystal panel is driven at a low frame frequency of 30 Hz or below, the frequency can be recognized as a flicker by an operator, but the flicker on a display picture can be suppressed by an increased degree of interlacing depending on the optical characteristics and response speed of the liquid crystal used.

In such an interlaced scanning drive scheme (referred to as Second embodiment) using different degrees of interlacing such as skipping of one line, two lines, three lines, four lines . . . , it is possible to obtain a good picture quality free from crosstalk by using two drive modes in combination according to the present invention.

Further, as shown in a table presented as FIG. 5, the sequence of applying drive waveforms is changed for each frame to apply difference scanning signals to the respective scanning electrodes at an averagely equal duty (Third embodiment), it becomes possible to increase the durability of the liquid crystal device 8. Also in this embodiment, a good picture free from crosstalk can be obtained.

Figure 6:
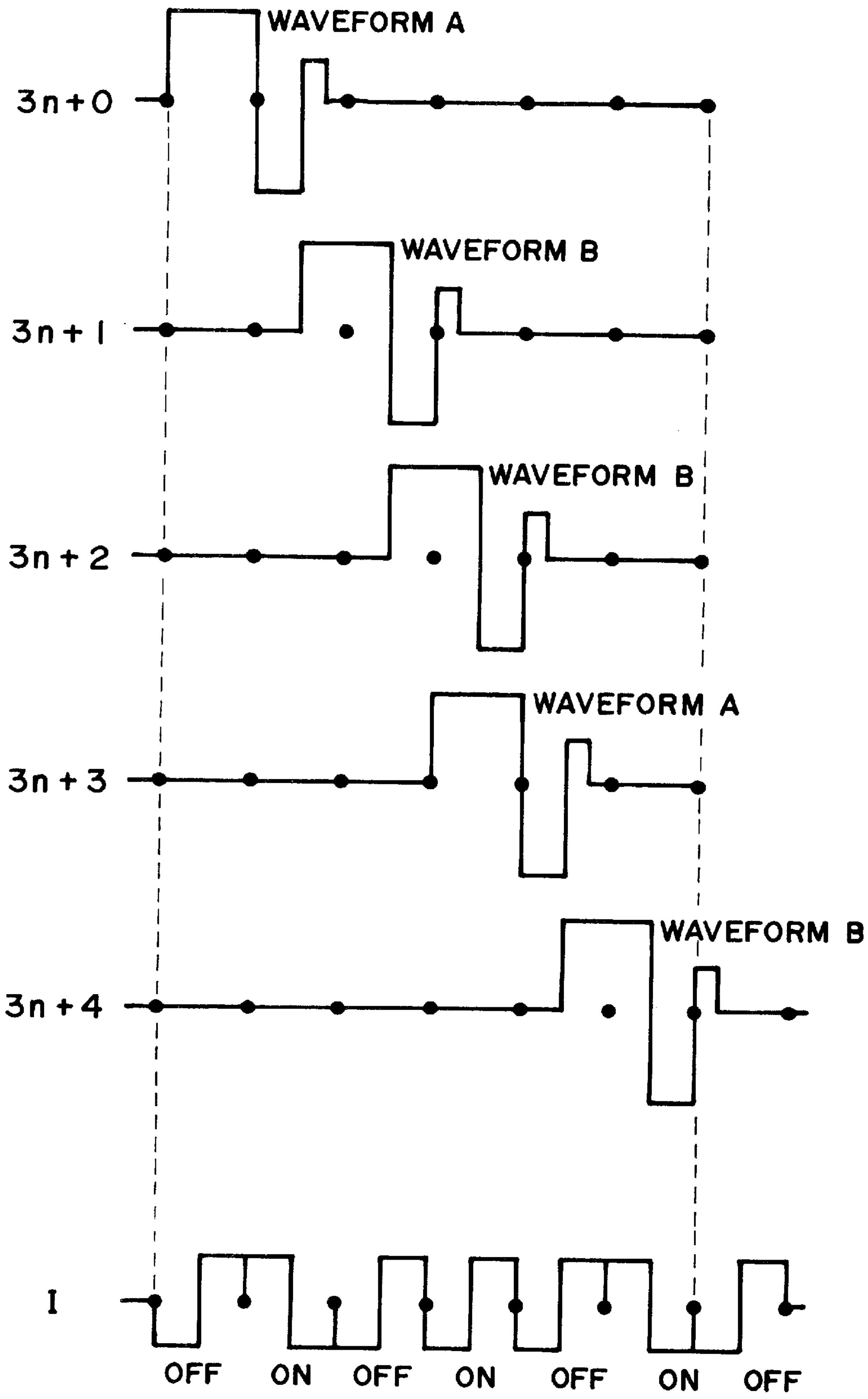
FIG. 6 shows a partial set of time-serial drive waveforms including application of waveform A to every third scanning line.

In the above, embodiments using a driving method or drive waveform switching cycle including three scanning lines have been described. Instead thereof, it is possible to use a drive mode switching or setting cycle including 5 lines as shown in FIG. 6 such that, in each frame operation, 3*n*+1-th and 3*n*+3-th lines receive the scanning signal of the waveform A, and 3*n*+1-th, 3*n*+2-th and 3*n*+4-th lines receive the scanning signal of the waveform B.

In this case (Fourth embodiment), a data electrode in the display pattern region 20*a* and a drive electrode in the background region 20*b* in FIG. 12 receive successions of data signals shown in FIGS. 7B and 7A, respectively. As a result, even when a display pattern 20*a* of alternate black and white horizontal stripes is displayed on a white background 20*b* as shown in FIG. 12, a substantial crosstalk does not occur between the white background regions (3)-(*a*) and (3)-(*b*). Also, in this embodiment, it is also possible to change the sequence of applying the driving methods A and B for each frame as explained with reference to FIG. 5, it is possible to improve the durability of the liquid crystal device 8 while obtaining a good picture quality.

Figure 8:
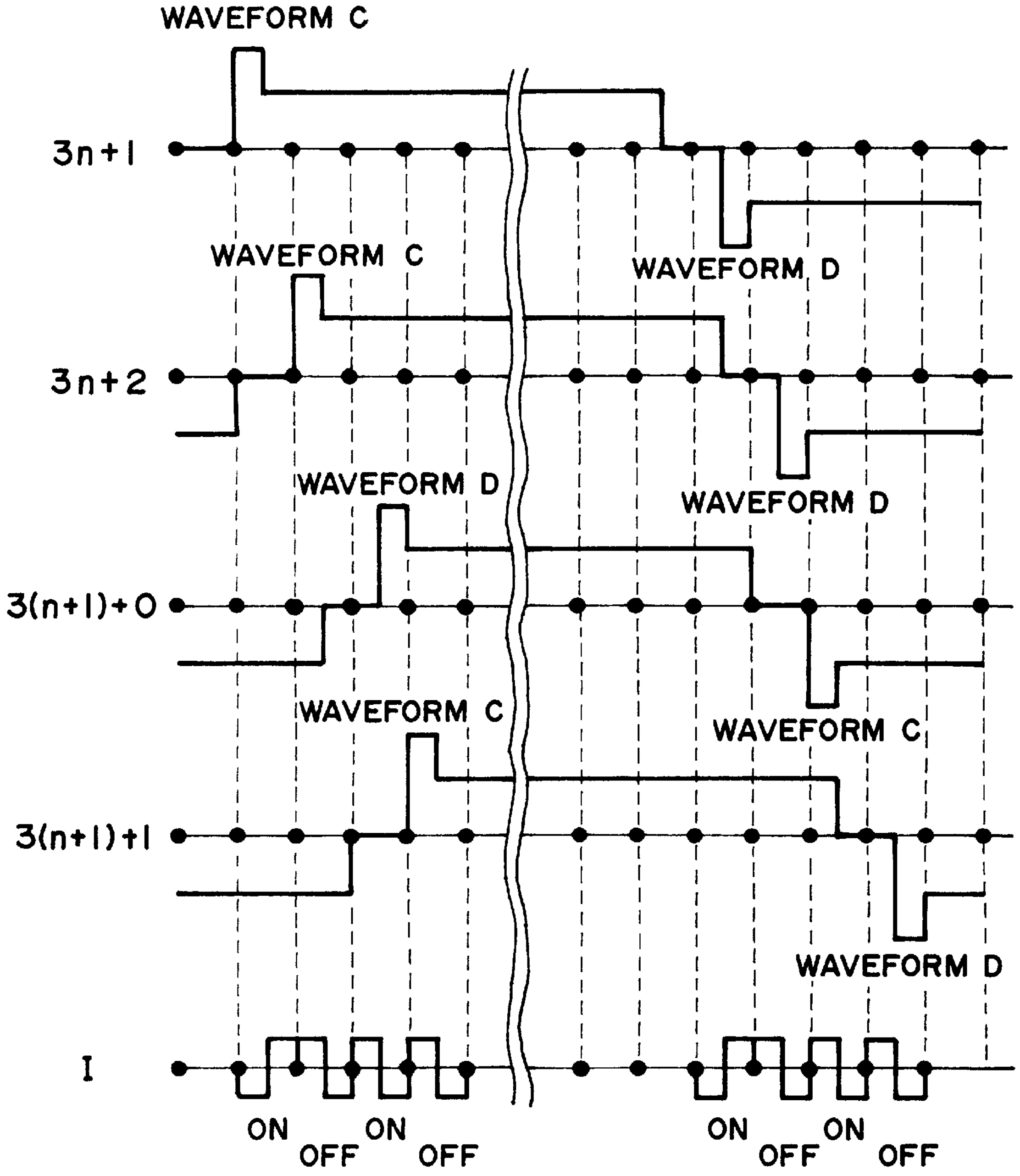
FIG. 8 shows a partial set of time-serial drive waveforms including alternate application of waveforms A and B for driving an anti-ferroelectric liquid crystal.

FIG. 8 shows a set of time-serial waveforms suitable for driving an anti-ferroelectric liquid crystal according to an embodiment of the present invention, including a third drive waveform C wherein a scanning write pulse is set at a former half of one-line writing period and a fourth drive waveform D wherein a scanning write pulse is set at a latter half of one-line writing period. In the case of driving an anti-ferroelectric liquid crystal, it is preferred to apply an offset voltage at the time of non-selection and invert the polarity of the offset voltage at each frame.

More specifically, it is preferred to apply the third drive waveform C to 3*n*+1-th and 3*n*+2-th lines and the fourth drive waveform D to 3*n*+0-th line in a first frame; and invert the polarities and exchange the allotment of the drive waveforms C and D (i.e., apply the polarity-inverted fourth drive waveform D to 3*n*+1-th and 3*n*+2-th lines and the polarity-inverted third drive waveform C to 3*n*+0-th line) in a second frame (Fifth embodiment).

Also in this Fifth embodiment, the (3)-(*a*) region and the (3)-(*b*) region in FIG. 12 receive successions of data signals shown in FIGS. 4B and 4A, respectively, so that crosstalk therebetween is suppressed.

Then, Sixth embodiment of driving the liquid crystal device with drive waveforms A and B shown in FIGS. 2A and 2B will be described. The characteristics of these waveforms may be summarized as follows.

(1) Waveforms A and B are switched between each other for writing on each prescribed number of lines (for each prescribed number of horizontal scanning periods).

(2) Each data signal comprises bipolar pulses for DC composition, i.e., not providing a net DC component.

(3) Each waveform includes ON- and OFF-data signals of mutually antiphases, and the waveforms A and B include mutually different ON- (or OFF-) data signals for providing an identical optical state of ON (or OFF) which are of anti-phases.

(4) Corresponding to the change in data signal waveform, the writing phases of scanning signals in the waveforms are a former half and a latter half, respectively, of one-line writing period (1LS).

More specifically, during one frame scanning in this embodiment, the waveform A is used for scanning of 3*n*+1-th lines and 3*n*+2-th lines, and the waveform B is used for scanning of 3*n*+0-th lines (n: integer) as shown in FIG. 3. According to this embodiment, even in case of displaying a picture pattern of one-line alternate black and white horizontal stripes at a central region 20*a* on a white background region 20*b*, it is possible to display a good picture free from crosstalk.

In this embodiment, a secession of data signals causes little change in frequency depending on a picture pattern to be displayed such that the frequency of data signal succession is almost equal to that of the waveform shown in FIG. 11A and nearly a half that of the waveform shown in FIG. 11B. Accordingly, the power consumption depending on the frequency of drive waveform is considerably reduced. According to an actual test obtained by using a liquid crystal panel for an ordinary word processor operation, the waveform of this embodiment required 2.0 W whereas a conventional waveform shown in FIG. 11A required 2.5 W and a conventional waveform shown in FIG. 11B required 4.0 W.

As described above, by using the drive waveforms A and B shown in FIGS. 2A and 2B while exchanging them in a three-line cycle, a good picture quality was obtained at a low power consumption.

FIG. 9 shows a table indicating the applicability of the above-mentioned Sixth embodiment for sequentially applying the waveform A to 3*n*+0-th lines, the waveform A to 3*n*+1-th lines and the waveform B to 3*n*+2-th line in various degrees of interlaced scanning (Seventh embodiment), wherein 3*n*+0, 3*n*+1 and 3*n*+2 (n: natural number) represent the chronological order of selection of scanning lines and not the positional order of the scanning lines.

The charge in degree of interlaced scanning adopted in this embodiment was effective for suppressing the occurrence of flicker noticeable to an operator.

In Eighth embodiment, the waveforms A and B used in Sixth embodiment were used in a different exchange order for each frame as shown in a table of FIG. 5. As a result, the respective scanning lines were supplied with different waveforms in an averaged probability while providing a good picture free from crosstalk.

In Ninth embodiment, a 5-line waveform exchange cycle between waveforms A and B was adopted wherein the waveform A was applied to 3*n*+0-th line and 3*n*+3-th line, and the waveform B was applied to 3*n*+1–h line, 3*n*+2-th line and 3*n*+4-th line. This embodiment was also found effective for display a good picture including a pattern as shown in FIG. 12 without crosstalk.

In Tenth embodiment, an anti-ferroelectric liquid crystal panel was driven by applying waveforms as shown in FIG. 8 in a manner as described above. In actual drive by using a liquid crystal comprising 320×240 pixels using a liquid crystal material ("CS4000" available from Chisso K.K.), a good picture was obtained.

As a modification, the sequence of application of the waveforms C and D was changed for each frame in a manner similar to that explained with reference to FIG. 5. A good picture was also obtained.

In Eleventh embodiment, a liquid crystal panel using a bistable nematic liquid crystal was prepared and driven according to a scheme as described in JP-B 1-51818 (principle) and JP-A 6-230751 (driving method).

The nematic liquid crystal was prepared by adding an optically active dopant to a commercially available liquid crystal material ("KN-4000", available from Chisso K.K.) so as to provide a helical pitch of 3.6 $\mu$m and incorporated in a cell prepared by disposing a pair of substrates each coated with a 100 $\mu$m-thick polyimide alignment film and rubbed so as to align the rubbed directions in mutually parallel but opposite directions.

Figure 10:
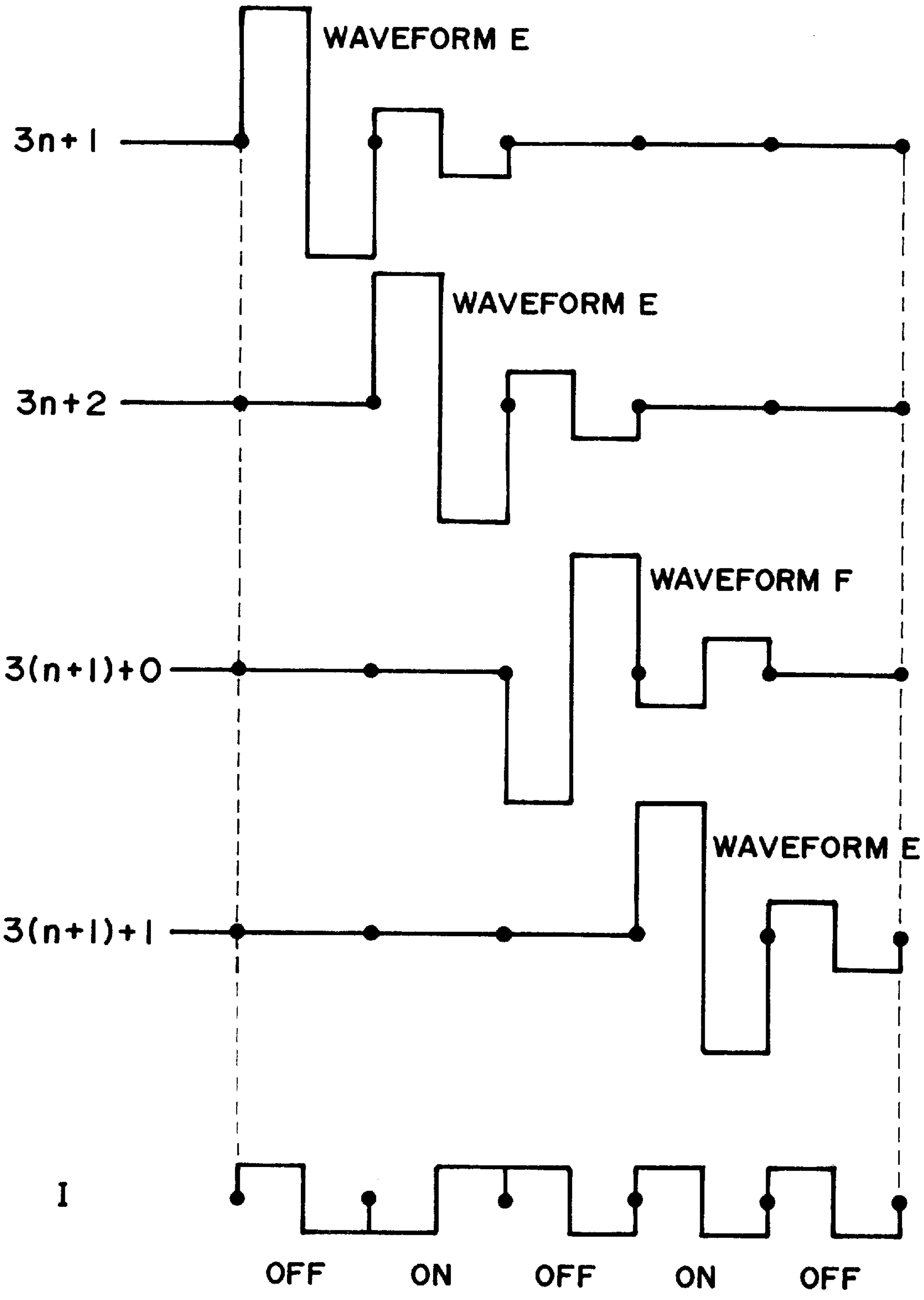
FIG. 10 shows a partial set of time-serial drive waveforms including application of waveform F on every third scanning line for driving a nematic liquid crystal.

The liquid crystal panel was driven by applying a set of waveforms as shown in FIG. 10 wherein waveforms E and F were applied in a three-line exchange cycle so as to apply waveform E to every third line and applying data signals of mutually antiphases in synchronism with the scanning waveforms E and F, respectively.

As a result of drive under the conditions of a reset voltage of ±20 V, a write voltage of ±2.5 V and data signal voltages of ±1.5 V, prescribed data was written to display a good picture free from crosstalk.

As described above, according to the present invention, data signals of mutually anti-phases are exchanged with each other for displaying an identical optical state (ON or OFF) to allow the use of lower-frequency waveform for displaying a pattern display region and a background region and minimize the change in applied waveform frequency depending on a change in display pattern.

By the decrease in application waveform frequency change, it is possible to suppress the occurrence of crosstalk and realize a high-picture quality liquid crystal apparatus. Further, accompanying the lowering in applied waveform frequency, it is possible to realize a liquid crystal device of a lower power consumption.

What is claimed is:

1. A liquid crystal apparatus, comprising:

a liquid crystal device comprising a pair of substrates having thereon a group of scanning electrodes and a group of data electrodes intersecting the scanning electrodes so as to form an electrode matrix, and a liquid crystal disposed between the substrates so as to form a pixel at each intersection of the scanning electrodes and the data electrodes assuming an ON-state and an OFF-state, scanning signal application means for sequentially applying a scanning signal to the scanning electrodes, data signal-application means for applying data signals including a first data signal and a second data signal selectively to the data electrodes in synchronism with the scanning signal, and control means for periodically switching between a first drive mode of using the first and second data signals for providing the ON- and OFF-states, respectively, of the pixels and a second drive mode of using the first and second data signals for providing the OFF- and ON-states, respectively, of the pixels, within one vertical scanning period.

2. An apparatus according to claim 1, wherein each of the first and second data signals comprises bipolar pulses having mutually different polarities.

3. An apparatus according to claim 1, wherein the scanning signal is caused to have mutually different waveforms in the first and second drive modes.

4. An apparatus according to claim 1, wherein said liquid crystal is a chiral smectic liquid crystal.

5. An apparatus according to claim 1, wherein said liquid crystal is a ferroelectric liquid crystal.

6. An apparatus according to claim 1, wherein said liquid crystal is a chiral nematic liquid crystal.

* * * * *

UNITED STATES PATENT AND TRADEMARK OFFICE

CERTIFICATE OF CORRECTION

PATENT NO. : 5,995,076

DATED : November 30, 1999

INVENTOR(S) : AKIRA TSUBOYAMA ET AL.

It is certified that error appears in the above-identified patent and that said Letters Patent is hereby corrected as shown below:

ON TITLE PAGE AT [56] REFERENCES CITED, FOREIGN PRIORITY DATA

"63155032" should read --63-155032--;
"6451818" should read --64-51818--.

COLUMN 1

Line 39, "shown,in" should read --shown in--;
Line 48, "(b)))" should read --(b))--;
Line 58, ""while")," should read --"white"),--.

COLUMN 2

Line 19, "a-lowering" should read --a lowering--.

COLUMN 4

Line 35, "state." should read --states--.

COLUMN 5

Line 36, "successions of data signal" should read --succession of data signals--.

COLUMN 6

Line 6, "has" should read --have;
Line 19, "when" should read --when the--;
Line 39, "difference" should read --different--;
Line 60, "also" should be deleted;
Line 62, "it is" should read --and it is--.

UNITED STATES PATENT AND TRADEMARK OFFICE
CERTIFICATE OF CORRECTION

PATENT NO. : 5,995,076

DATED : November 30, 1999

INVENTOR(S) : AKIRA TSUBOYAMA ET AL.

It is certified that error appears in the above-identified patent and that said Letters Patent is hereby corrected as shown below:

COLUMN 8

Line 4, "charge" should read --change--;
Line 17, "display" should read --displaying--.

Signed and Sealed this

Third Day of April, 2001

Attest:

Nicholas P. Godici

NICHOLAS P. GODICI

*Attesting Officer*

*Acting Director of the United States Patent and Trademark Office*